US011070978B2

(12) United States Patent
Conil et al.

(10) Patent No.: US 11,070,978 B2
(45) Date of Patent: Jul. 20, 2021

(54) TECHNIQUE FOR AUTHENTICATING A USER DEVICE

(71) Applicant: ORANGE, Issy-les-Moulineaux (FR)

(72) Inventors: Patrice Conil, Leguevin (FR); Thierry Tassain, Toulouse (FR)

(73) Assignee: ORANGE

( * ) Notice: Subject to any disclaimer, the term of this patent is extended or adjusted under 35 U.S.C. 154(b) by 0 days.

(21) Appl. No.: 16/300,276

(22) PCT Filed: Apr. 27, 2017

(86) PCT No.: PCT/FR2017/051000
§ 371 (c)(1),
(2) Date: Nov. 9, 2018

(87) PCT Pub. No.: WO2017/194852
PCT Pub. Date: Nov. 16, 2017

(65) Prior Publication Data
US 2019/0149991 A1    May 16, 2019

(30) Foreign Application Priority Data

May 10, 2016    (FR) ...................................... 1654174

(51) Int. Cl.
*H04M 1/66*     (2006.01)
*H04M 1/68*     (2006.01)
(Continued)

(52) U.S. Cl.
CPC ........... *H04W 12/069* (2021.01); *H04L 63/08* (2013.01); *H04L 63/0815* (2013.01);
(Continued)

(58) Field of Classification Search
CPC ....... H04W 4/14; H04W 8/183; H04W 12/06; H04W 12/12
(Continued)

(56) References Cited

U.S. PATENT DOCUMENTS

| 2008/0047020 | A1* | 2/2008 | Masui ............... H04N 1/00209 726/26 |
| 2012/0144202 | A1 | 6/2012 | Counterman |

(Continued)

OTHER PUBLICATIONS

International Search Report dated Jul. 13, 2017 for corresponding International Application No. PCT/FR2017/051000, filed Apr. 27, 2017.

(Continued)

*Primary Examiner* — Matthew W Genack
(74) *Attorney, Agent, or Firm* — David D. Brush; Westman, Champlin & Koehler, P.A.

(57) ABSTRACT

A technique for authenticating a user device with an application package server implementing an application. The device obtains a secondary identifier, allowing it to receive notifications relating to the application. Next, the device dispatches, while being identified by a main identifier associated with the device by way of a security module, a signalling message including the secondary identifier. Subsequent to this dispatching, the device receives a notification relating to the application which is addressed to it while being identified by the secondary identifier. This notification, the dispatching of which has been commanded by the application package server, includes the main identifier and an authenticator. The device then dispatches an authentication request to the application package server. This authentication request includes the main identifier and the authenticator that was received. The device is authenticated by the application package server by using this main identifier in association with this secondary identifier.

15 Claims, 2 Drawing Sheets

(51) Int. Cl.
*H04M 3/16* (2006.01)
*H04W 12/069* (2021.01)
*H04L 29/06* (2006.01)
*H04W 12/06* (2021.01)
*H04W 12/03* (2021.01)
*H04W 12/69* (2021.01)
*H04W 12/0433* (2021.01)
*H04W 76/11* (2018.01)
*H04W 60/00* (2009.01)
*H04L 29/08* (2006.01)
*H04W 12/72* (2021.01)
*H04W 12/75* (2021.01)

(52) U.S. Cl.
CPC ....... *H04W 12/03* (2021.01); *H04W 12/0433* (2021.01); *H04W 12/06* (2013.01); *H04W 12/69* (2021.01); *H04W 60/00* (2013.01); *H04W 76/11* (2018.02); *H04L 63/062* (2013.01); *H04L 63/0876* (2013.01); *H04L 67/26* (2013.01); *H04W 12/72* (2021.01); *H04W 12/75* (2021.01)

(58) Field of Classification Search
USPC ................................. 455/410–411, 466, 551
See application file for complete search history.

(56) References Cited

U.S. PATENT DOCUMENTS

| | | | |
|---|---|---|---|
| 2012/0278854 A1 | 11/2012 | Ton et al. | |
| 2012/0317261 A1* | 12/2012 | Ahmavaara | H04L 63/0815 709/223 |
| 2014/0056220 A1* | 2/2014 | Poitau | H04W 76/14 370/328 |
| 2016/0301779 A1* | 10/2016 | Cui | H04L 63/20 |
| 2017/0142205 A1* | 5/2017 | Makke | H04L 67/12 |
| 2017/0244706 A1* | 8/2017 | Ren | H04L 63/102 |

OTHER PUBLICATIONS

Written Opinion of the International Searching Authority dated Jul. 13, 2017 for corresponding International Application No. PCT/FR2017/051000, filed Apr. 27, 2017.

English Translation of the Written Opinion of the International Searching Authority dated Jul. 25, 2017 for corresponding International Application No. PCT/FR2017/051000, filed Apr. 27, 2017.

* cited by examiner

TECHNIQUE FOR AUTHENTICATING A USER DEVICE

CROSS-REFERENCE TO RELATED APPLICATIONS

This Application is a Section 371 National Stage Application of International Application No. PCT/FR2017/051000, filed Apr. 27, 2017, the content of which is incorporated herein by reference in its entirety, and published as WO 2017/194852 on Nov. 16, 2017, not in English.

FIELD OF THE DISCLOSURE

The invention pertains to the general field of telecommunications.

The invention relates more particularly to a technique for authenticating a user device with a server implementing an application.

BACKGROUND OF THE DISCLOSURE

Numerous applications request identification from a user. To be able to connect to an application, a user has to for example fill in a connection identifier, comprising a user identifier and a password. The connection identifier allows the administrator of a service to manage the access rights of a user associated with this identifier for this application. This type of identification requires the user to create an account on the server implementing the application and to remember a connection identifier and a password.

It is also common to use an identifier of a subscription with an operator, typically the MSISDN (for "mobile station integrated services digital network number"), as a basis. This identifier is the publicly known identification number of the user in the network of his operator. It is this identifier, commonly called a telephone number, that has to be dialed in order to connect the user who has subscribed to a subscription. When a user device is connected to the network of its own operator, there are network mechanisms that allow an application provided by this operator to reliably acquire this identifier. This makes it possible implicitly to authenticate the user.

In other cases, the identifier would have to be supplied declaratively by the user, and there is no guarantee that the supplied identifier actually belongs to this user. It is thus not possible implicitly to authenticate a subscriber of another operator.

SUMMARY

One of the aims of the invention is to remedy inadequacies/drawbacks of the prior art and/or to make improvements thereto.

According to a first aspect, one subject of the invention is a method for authenticating a user device with a server implementing an application, called application server. This method comprises:

acquisition, by the device, of an identifier, called secondary identifier, allowing the device to receive notifications relating to the application:

sending, by the device, identified by an identifier, called main identifier, associated with the device by way of a security module, of a signaling message comprising the secondary identifier;

reception, by said device, of a notification relating to the application and addressed to the device identified by the secondary identifier, said notification comprising the main identifier and an authenticator, and the sending of which was commanded by the application server;

sending, by said device, to the application server, of an authentication request, said request comprising the received main identifier and authenticator, said device being authenticated by the application server by way of said main identifier in combination with said secondary identifier.

In conjunction, the method for authenticating a user device with a server implementing an application, called application server, comprises:

acquisition, by the application server, of a request to register said device by way of a main identifier and of a secondary identifier, which are acquired from a signaling message sent by the device identified by said main identifier, associated with the device by way of a security module, said message comprising the secondary identifier, acquired by the device in order to receive notifications relating to the application:

commanding, by the application server, of sending of a notification relating to the application and addressed to the device identified by the secondary identifier, said notification comprising the main identifier and an expected authenticator;

reception, by the application server, of an authentication request from the device, said request comprising the main identifier and an authenticator, said device being authenticated by the application server by way of said main identifier in combination with said secondary identifier when the received authenticator corresponds to the expected authenticator.

It is thus possible for the application, at the level both of the user device and of the application server, to reliably acquire an identifier of the user without requiring manipulation from the user. This identifier of the user, called main identifier, is the one that is stored in a security module associated with the user device. It is acquired by the application server by way of a signaling message, which comprises this identifier as the originating address of the message. The client path is highly simplified and secure. The user does not need to create an account with the operator implementing the application. He does not need to remember a connection identifier and a password for this application. In addition, the secondary identifier allows the application to push information by way of notifications intended for the user device ("push" mode). These notifications are for example pushed by a notification server. It is thus possible to perform implicit authentication even when the user of the user device has not subscribed to a subscription with the operator providing the application. This technique is applied with particular benefit in the authentication of connected objects.

The various embodiments or embodiment features mentioned hereinafter may be added independently or in combination with one another to the authentication method such as defined above.

According to one particular feature of the authentication method, the secondary identifier contained in the signaling message is encrypted by the device by way of a key shared with the application server. In conjunction, the secondary identifier contained in the signaling message is decrypted by the application server by way of a key shared with the device.

Encrypting the secondary identifier makes it possible to guarantee to the application server that the user device actually has the key shared by the user device and the application server, and thus actually executes the application.

In one particular embodiment of the authentication method, the main identifier and the authenticator contained in the notification are decrypted by the device by way of a key shared with the application server. In conjunction, the main identifier and the authenticator contained in the notification are encrypted by the application server by way of a key shared with the device.

An apparatus serving as intermediary between the application server and the user device, if it intercepts the notification, is not able to decode the information that it contains, in particular the main identifier and the authenticator. It is not possible for another user device to pose as the device that requested to register.

In one particular embodiment of the authentication method, the key is determined by the device from a contact address associated with the application and from an identifier of the application. This key may also be determined by the application server from a contact address associated with the application and from an identifier of the application.

This makes it possible to guarantee that the user device actually has the identifier of the application and the algorithm for generating the shared key.

In one particular embodiment of the authentication method, the device requests the secondary identifier by supplying an identifier of the application.

Supplying the identifier of the application then allows the application server to command the sending of the notification to the user device.

According to a second aspect, the invention also relates to a user device comprising:

a module for communicating with a notification server, designed to acquire an identifier, called secondary identifier, and to receive notifications relating to the application and addressed to the device identified by the secondary identifier;

a signaling module, designed to send a signaling message comprising a secondary identifier and as the originating address, an identifier, called main identifier, associated with the device by way of a security module;

an authentication module, designed to extract the main identifier and an authenticator from a received notification relating to the application and to send an authentication request to an application server, said request comprising the received main identifier and authenticator, said device being authenticated by the application server by way of said main identifier in combination with said secondary identifier.

This user device may of course include, in structural terms, the various features relating to the authentication method such as described above, which features may be combined or taken individually. The advantages stated in respect of the authentication method according to the first aspect are thus able to be transposed directly to the user device. They are therefore not described in more detail.

According to a third aspect, the invention also relates to a server implementing an application, called application server. This server comprises:

an authentication module, designed to acquire a request to register a user device by way of a main identifier and of a secondary identifier, which are acquired from a signaling message sent by the device identified by said main identifier, associated with the device by way of a security module, said message comprising the secondary identifier, acquired by the device in order to receive notifications relating to the application and to generate an authenticator for said device;

a command module, designed to command sending of a notification relating to the application and addressed to the device identified by the secondary identifier, said notification comprising the main identifier and an expected authenticator; said authentication module furthermore being designed to receive an authentication request from the device that requested to be registered, said request comprising the main identifier and an authenticator, said device being authenticated by the application server by way of said main identifier in combination with said secondary identifier when the received authenticator corresponds to the expected authenticator.

This application server may of course include, in structural terms, the various features relating to the authentication method such as described above, which features may be combined or taken individually. The advantages stated in respect of the authentication method according to the first aspect are thus able to be transposed directly to the application server. They are therefore not described in more detail.

According to a fourth aspect, the invention relates to a program for a user device, comprising program code instructions intended to command the execution of the steps of the authentication method described above that are implemented by the user device when this program is executed by this device, and a recording medium readable by a device on which a program for a device is recorded.

The advantages stated in respect of the authentication method according to the first aspect are able to be transposed directly to the program for a user device and to the recording medium.

According to a fifth aspect, the invention relates to a program for an application server, comprising program code instructions intended to command the execution of the steps of the authentication method described above that are implemented by the application server when this program is executed by this server, and a recording medium readable by a trusted entity on which a program for a server is recorded.

The advantages stated in respect of the authentication method according to the first aspect are able to be transposed directly to the program for a server and to the recording medium.

BRIEF DESCRIPTION OF THE DRAWINGS

The technique for authenticating a user device will be better understood with the aid of the following description of particular embodiments, with reference to the appended drawings, in which.

DETAILED DESCRIPTION OF ILLUSTRATIVE EMBODIMENTS

Figure 1:
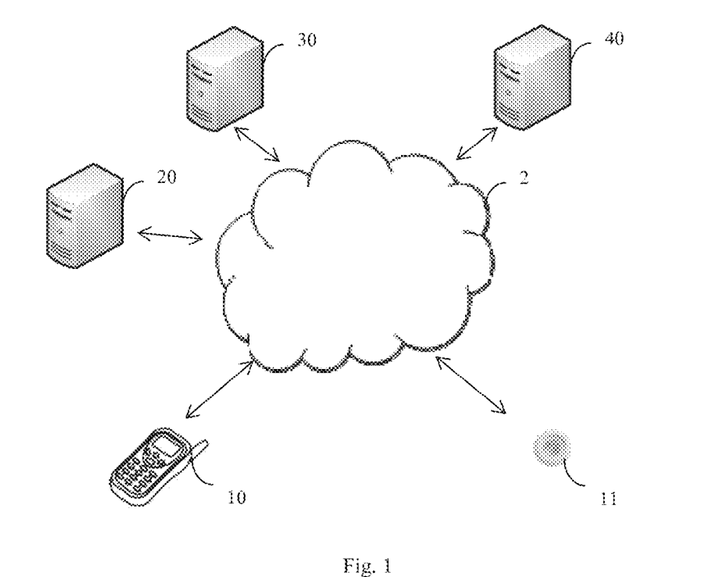
FIG. 1 shows an environment in which the method for authenticating a user device is implemented in one particular embodiment.

FIG. 1 shows an environment in which the method for authenticating a user device with a server implementing an application is implemented in one particular embodiment.

FIG. 1 shows two user devices 10, 11 accessing an application by way of a communication network 2. The first user device 10 is a mobile terminal connected to the communication network 2 by way of a wireless access network, such as a GSM, UMTS, LTE, etc. mobile network. This first user device 10 is equipped with a security module, associated with a subscription to which its user has subscribed with a first network operator. The second user device 11 is a connected object accessing the communication network 2 by way of a wireless access network, such as a GSM, UMTS, LTE, etc. mobile network. This second user device 11 is also equipped with a security module, associated with a subscription to which its user has subscribed with a second network operator. There is no limit attached to the number of user devices or to the number of network operators. By way of illustration, an example has been chosen in which a separate network operator is associated with each user device. However, there is no limit attached to this example. The users of the two devices may in particular have subscribed to a subscription with one and the same network operator.

The user identifier or main identifier Id_P corresponds for example to an identifier of a subscription with an operator, typically the MSISDN (for "mobile station integrated services digital network number"). This identifier is the publicly known identification number of the user in the network of his operator. It is this identifier, commonly called a telephone number, that has to be dialed in order to connect the user who has subscribed to a subscription. This main identifier is associated with the device by way of a security module. The security module may correspond to a removable chip card of USIM or UICC type, or else a secure software module running in a secure memory area of the user device, or else hosted on an apparatus of the network. There is no limit attached to this security module.

The communication network 2 makes it possible in particular to access a server 30 implementing an application, called application server. The application requests identification from the user. The application is for example a service accessible on the World Wide Web WWW, commonly called the Web, via hypertext exchanges.

A notification server 40 is also connected to the communication network 2. Such a notification server makes it possible to send notifications relating to an application to one or more user devices that have subscribed to this notification service. Each user device has acquired a notification identifier, hereinafter called secondary identifier and referenced Id_S. The notifications are transmitted in push mode, that is to say without a specific request from the user device. This notification server is for example a GCM (for "Google cloud messaging") server provided by Google, an APNS (for "Apple push notification service") server provided by Apple, or else a WNS (for "Windows push notification service") server provided by Microsoft.

A mediation server 20 is also connected to the communication network 2. This mediation server 20 is designed in particular to receive a signaling message originating from a device identified by a main identifier Id_P and comprising a secondary identifier Id_S, to extract the main identifier from the header of this signaling message and the secondary identifier from the payload, and to send a request to register the user device 10, 11 to the application server 30, this request comprising the two, main and secondary, extracted identifiers. The signaling message is an SMS (for "short message service") short message, such as defined for mobile communication networks compliant with the 3GPP standard. A scenario is adopted in this case in which the application server 30 and the mediation server 20 are separate. There is no limit attached to this embodiment. Specifically, it is possible to provide a single server performing the roles of the mediation server 20 and of the application server 30. In another embodiment, the signaling message is a USSD (for "unstructured supplementary service data") message. In this case, the application has to acquire authorization in order to send such a signaling message.

Figure 2:
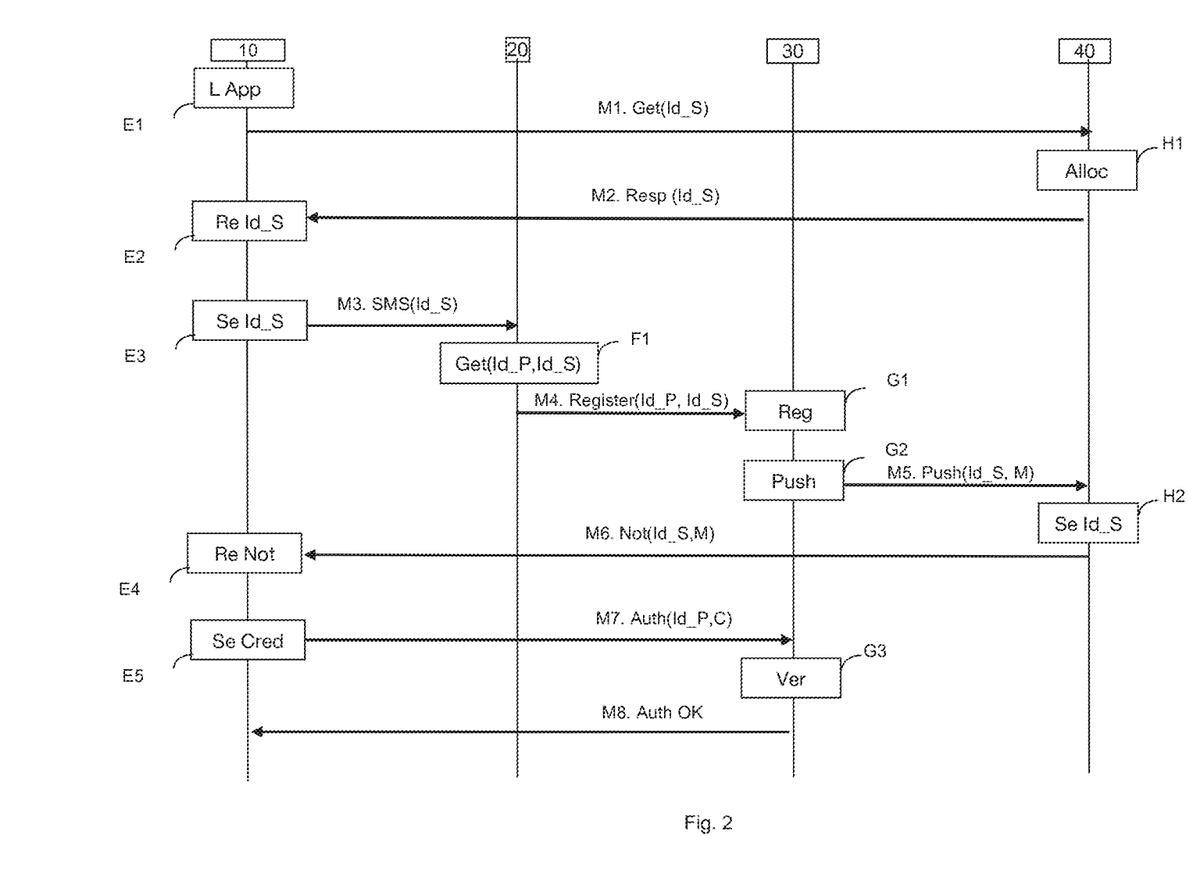
FIG. 2 illustrates steps of an authentication method that are implemented by a user device and an application server according to one particular embodiment.

FIG. 2 illustrates steps of a method for authenticating a user device 10 with a server implementing an application, called application server 30 according to one particular embodiment.

The user requests, by way of a human-machine interface of the user device 10, to initiate the application supplied by the server 30. More precisely, this initiation request is made by way of an icon that is displayed on a screen and with which the user is able to interact. In one particular embodiment, for example for the user device 11, the user interacts with a button in order to initiate the application.

In a sending step E1, the user device 10 (more precisely the application running on the device) sends a request M1 to the notification server 40 so as to acquire, in return, a secondary identifier Id_S for the application identified by the application identifier Id_A. The exchanges between the user device 10 and the server 40 are carried out in accordance with a protocol specific to the publication server. By virtue of this secondary identifier, the user device 10 is then able to receive notifications relating to the application from the notification server 40. In a step H1, once this request M1 has been received, the notification server 40 allocates a secondary identifier Id_S to the user device 10, stores it in combination with the application identifier Id_A, and transmits it, in return, to the user device 10 in a message M2.

In a reception step E2, the user device 10 acquires the allocated secondary identifier Id_S for this application. More precisely, the user device 10 receives it in the message M2. These steps E1 and E2 may have been executed, if appropriate, during an initial execution of the application, and the secondary identifier may have been stored by the user device 10 on this occasion. In this case, step E2 consists in acquiring the secondary identifier by reading from memory.

In a step E3, the user device 10 sends a signaling message M3 comprising the secondary identifier Id_S. In this embodiment, the signaling message corresponds to an SMS (for "short message service") short message addressed to a contact address associated with the application. To send this signaling message, the user device 10 is identified by its main identifier Id_P, associated with the device by way of the security module 107. It is recalled at this point that the main identifier Id_P corresponds to the MSISDN number associated with the user. Thus, the signaling message M3 comprises, in a header, the main identifier Id_P as the originating address of the message. It is emphasized at this point that the application itself does not fill in this originating address and does not have knowledge thereof when this step is executed. This is carried out by a signaling module 105, which fills in the originating address of all of the signaling messages that it sends with the main identifier Id_P. The secondary identifier Id_S is for its part carried by the payload of the message M3. The contact address for the application makes it possible to route the signaling message M3 to the mediation server 20.

In a step F1, the mediation server 20 receives the signaling message M3 and extracts the main identifier Id_S from the header and the secondary identifier Id_S from the payload. Still in this step F1, the mediation server 20 transmits a request M4 to register the user device 10 to the application server 30. This registration request M4 comprises in particular the main identifier Id_P and the secondary identifier Id_S, which were acquired from the signaling message M3 sent by the user device 10 identified by its main identifier Id_P.

The application server 30 receives the registration request M4 in a step G1 and stores the main identifier Id_P in combination with the secondary identifier Id_S in a memory area 305. Still in this step G1, the application server 30 generates an authenticator C (also called "credential" in English), for example randomly. A state associated with the user device 10 is "awaiting authentication". In a step G2, the application server 30 commands, by way of a message M5 to the notification server 40, sending of a notification M relating to the application and addressed to the device identified by the secondary identifier Id_S. This notification M comprises the main identifier Id_P and the expected authenticator C.

In a step H2, the notification server 40 receives the command M5 and pushes the notification M relating to the application to the user device 10 identified by the secondary identifier Id_S (message M6).

In a step E4, the user device 10 receives the notification M (message M6) and extracts the main identifier Id_P and the authenticator C from this notification M. The application running on the user device 10 thus acquires the main identifier Id_P for subsequent use, if appropriate. It is emphasized at this point that, for currently available user devices, it is not possible for the application to acquire this main identifier, as no application programming interface API is defined.

In a step E5, the user device 10 (more precisely the application running thereon) sends an authentication request M7 to the application server 30. This authentication request M7 comprises in particular the main identifier Id_P and the authenticator C.

In a step G3, the application server 30 verifies that the authenticator C actually corresponds to the authenticator expected for this main identifier Id_P. If this is the case, the state associated with the user device 10 becomes "authenticated", and the application server 30 returns a message M8 to the user device 10 confirming that the authentication has succeeded. If this is not the case (not shown in FIG. 2), that is to say if the received authenticator does not correspond to the authenticator expected for this main identifier Id_P, the application server 30 returns a message to the user device indicating that the authentication has failed. It is thus seen that, if successful, the application has reliably acquired the main identifier Id_P, at the level both of the user device and of the application server. The user device has been able to authenticate itself with the application server easily and securely. It is also seen that, from the point of view of the user, the path to executing the application is very easy to implement. It is enough for said user to initiate the execution of the application. The user therefore does not have to remember a password. Access is achieved by way of a user device that is authenticated by its network operator. There is no ambiguity regarding the identity of the user. The user device thus performs the role of a secure element and adds security in the authentication method for executing the application. The secondary identifier Id_S furthermore allows the application to easily subsequently transmit notifications to the user device.

The description of the authentication method has been given with reference to the user device 10. This method is of course also able to be applied to an implementation by the user device 11. It is recalled at this point that this user device 11 is a connected object, for which the user has subscribed to a subscription with a second operator other than the one (first operator) that is implementing the application server 30. It is seen that, for this device 11, the authentication is carried out implicitly, even though this device is not known to the first operator. The user of this device 11 does not have to create an account with the first operator before being able to execute the application.

In the various variants described hereinafter, an encryption key is shared by the user device 10 with the application server 30. In a first case, the encryption is symmetric and the shared key corresponds to the encryption key. In a second case, the encryption is asymmetric. One of the two apparatuses (user device or application server) has the public key associated with the private key of the second apparatus.

In a first variant embodiment, in step E3, the secondary identifier contained in the signaling message is encrypted by the user device 10 by way of the shared key (secret key in the case of symmetric encryption, public key of the application server in the case of asymmetric encryption). The mediation server 20 then extracts the encrypted secondary identifier Id_S and transmits it to the application server 30, which then decrypts it in step G1 by way of the shared key (secret key in the case of symmetric encryption, private key of the application server in the case of asymmetric encryption). This makes it possible to guarantee to the application server 30 that the secondary identifier has actually been transmitted by the application running on the user device 10.

In a second variant embodiment, in step G1, the notification M is encrypted by the application server 30 by way of the shared key (secret key in the case of symmetric encryption, public key of the user device in the case of asymmetric encryption). The user device 10 then decrypts, in step E4, the received notification M by way of the shared key (secret key in the case of symmetric encryption, private key of the user device in the case of asymmetric encryption). This makes it possible to guarantee to the user device 10 that the notification has actually been prepared by the application server 30.

A third variant combines the two previous variants. More precisely, the content of the signaling message M3 and the notification M are transmitted in an encrypted manner. This third variant has the advantages of the two previous variants.

In the case of symmetric encryption, in one particular embodiment, the key is determined by the user device from the contact address associated with the application and from an identifier of the application. It is recalled at this point that the contact address associated with the application corresponds to the address used as destination address for the signaling message M3 in step E3. More precisely, the key is determined by applying a cryptographic hash function, for example the function SHA-1 (for "secure hash algorithm"), for hashing the contact address by the application identifier (or vice versa). There is no limit attached to this function for determining the key, provided that the function and its parameters are known both to the user device and to the application server.

In one particular embodiment, the user device 10 supplies an identifier of the application Id_A in the message M1. This allows the notification server 40 to identify the application that will then transmit notifications to the user device.

Figure 3:
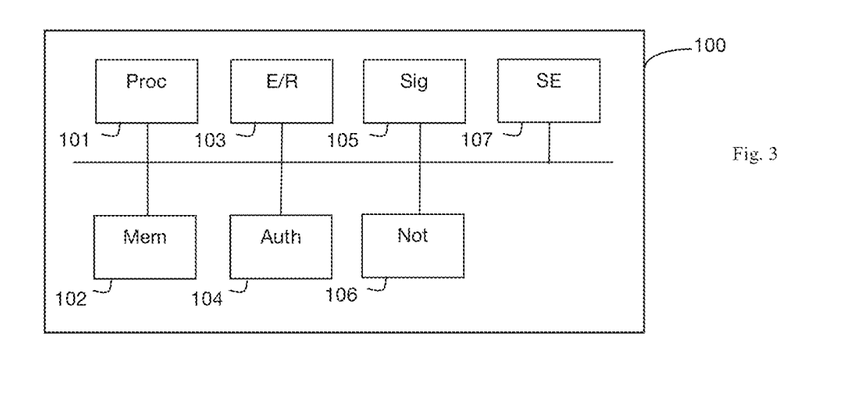
FIG. 3 shows a user device according to one particular embodiment.

FIG. 3 shows a user device 100 in one particular embodiment. The user device 100 comprises in particular:
a processor 101 for executing code instructions of software modules;

a memory area 102, designed to store an application that comprises code instructions for implementing the steps of the authentication method;

a storage memory, not shown, designed to store data used in the implementation of the authentication method;

a module 103 for interfacing with a communication network, designed to transmit and receive data;

an authentication module 104, designed to execute an authentication phase when the application is initiated;

a signaling module 105, designed to send a signaling message comprising as the originating address an identifier, called main identifier, associated with the device by way of a security module 107;

a module 106 for communicating with a notification server 40, designed to acquire an identifier, called secondary identifier, and to receive notifications relating to the application by being addressed by the secondary identifier;

the security module 107, designed to store a main identifier Id_P.

The authentication module 104 is in particular designed to:

command sending, by the signaling module 105, of a signaling message comprising a secondary identifier;

extract the main identifier and an authenticator from a notification relating to the application and received by the communication module 106;

send an authentication request to an application server 30, said request comprising the received main identifier and authenticator, said device being authenticated by the application server by way of said main identifier in combination with said secondary identifier.

In one particular embodiment, the signaling module 105 corresponds to a module for sending and receiving short messages.

In one particular embodiment, the user device 100 also comprises an encryption module. The authentication module 104 requests the encryption module to encrypt the secondary identifier by way of a key shared with the application server, and then commands sending of this encrypted identifier.

In one particular embodiment, the user device 100 also comprises a decryption module. The authentication module 104 requests the decryption module to decrypt the main identifier and the authenticator contained in a received notification by way of a key shared with the application server.

In another particular embodiment, the user device 100 comprises an encryption/decryption module. The functions of this module combine those of the corresponding modules in the two embodiments described previously.

In one particular embodiment, the encryption and/or decryption key is determined by the authentication module 104 from a contact address associated with the application and from an identifier of the application.

In one particular embodiment, the communication module 106 is designed to request the secondary identifier by supplying an identifier of the application.

It is emphasized at this point that the user device 100 also comprises other processing modules, not shown in FIG. 3, that are designed to implement the various functions of a user device.

Figure 4:
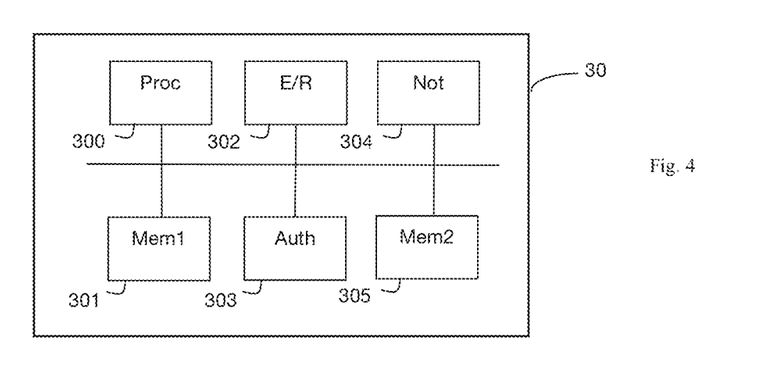
FIG. 4 shows an application server according to one particular embodiment.

FIG. 4 shows a server 30 implementing an application in one particular embodiment. The server, called application server, comprises in particular:

a processor 300 for executing code instructions of software modules;

a first memory area 301, designed to store an application that comprises code instructions for implementing the steps of the authentication method;

a storage memory, not shown, designed to store data used in the implementation of the authentication method;

a module 302 for interfacing with a communication network, designed to transmit and receive data;

an authentication module 303;

a command module 304, designed to command sending of a notification relating to the application and addressed to the device identified by the secondary identifier, said notification comprising the main identifier and an expected authenticator;

a second memory area 305, designed to store, for a main identifier, a secondary identifier.

The authentication module 303 is in particular designed to:

acquire a request to register a user device 10, 11 by way of a main identifier and of a secondary identifier, which are acquired from a signaling message sent by the device identified by said main identifier, associated with the device by way of a security module, said message comprising the secondary identifier, acquired by the device in order to receive notifications relating to the application, generate an authenticator for said device, receive an authentication request from the device that requested to be registered, said request comprising the main identifier and an authenticator;

authenticate the device by way of said main identifier in combination with said secondary identifier when the received authenticator corresponds to the expected authenticator.

In one particular embodiment, the application server 30 also comprises a signaling module designed to receive a signaling message sent by the device identified by a main identifier, associated with the device by way of a security module, this message comprising the secondary identifier, acquired by the device in order to receive notifications relating to the application.

It is emphasized at this point that the application server 30 also comprises other processing modules, not shown in FIG. 4, that are designed to implement the various functions of a server.

There is no limit attached to these various embodiments, and those skilled in the art are able to define further embodiments by combining acquisition of a secondary identifier in order to receive notifications relating to an application and transmission of a signaling message allowing a server implementing the application to acquire a main identifier.

The authentication technique is implemented by way of software components and/or hardware components. In this regard, the term "module" may correspond in this document equally to a software component, to a hardware component or to a set of hardware and/or software components, able to implement a function or a set of functions, according to what is described above in respect of the module in question.

A software component corresponds to one or more computer programs, one or more subroutines of a program, or more generally to any element of a program or of an item of software. Such a software component is stored in memory and then loaded and executed by a data processor of a physical entity, and is able to access the hardware resources of this physical entity (memories, recording media, communication buses, electronic input/output cards, user interfaces, etc.).

In the same way, a hardware component corresponds to any element of a hardware assembly. It may or may not be a programmable hardware component, with or without an integrated processor for executing software. It is for example an integrated circuit, a chip card, an electronic card for executing firmware, etc.

In one particular embodiment, the modules 104, 106 are designed to implement the authentication method described above. These are preferably software modules comprising software instructions for executing the steps of the authentication method described above that are implemented by a user device. The invention therefore also relates to:
- a program for a user device, comprising program code instructions intended to command the execution of the steps of the authentication method described above when said program is executed by this user device;
- a recording medium readable by a user device and on which the program for a device is recorded.

In one particular embodiment, the modules 303, 304 are designed to implement the authentication method described above. These are preferably software modules comprising software instructions for executing the steps of the authentication method described above that are implemented by a server implementing an application. The invention therefore also relates to:
- a program for an application server, comprising program code instructions intended to command the execution of the steps of the authentication method described above when said program is executed by this application server;
- a recording medium readable by an application server and on which the program for a server is recorded.

The software modules may be stored in or transmitted by a data medium. The latter may be a hardware storage medium, for example a CD-ROM, a magnetic floppy disk or a hard disk, or else a transmission medium such as an electrical, optical or radio signal, or a telecommunication network.

Although the present disclosure has been described with reference to one or more examples, workers skilled in the art will recognize that changes may be made in form and detail without departing from the scope of the disclosure and/or the appended claims.

The invention claimed is:

1. An authentication method for authenticating a user device with an application server implementing an application, said method comprising:
   acquiring, by the device, a secondary identifier allowing the device to receive notifications relating to the application, the device also being identified by a main identifier, which is associated with the device by way of a security module;
   sending, by the device to a contact address associated with the application, a signalling message comprising: the secondary identifier in a payload of the signalling message; and the main identifier in a header of the signalling message as an originating address of the signalling message;
   receiving, by said device in response to sending the signalling message, a notification relating to the application and addressed to the device identified by the secondary identifier, said notification comprising the main identifier and an authenticator generated by the application server for authentication of the user device, and the sending of which was commanded by the application server; and
   sending, by said device, to the application server, an authentication request, said request comprising the main identifier and the authenticator that were extracted from the notification, for authentication of said device by the application server by way of said main identifier in combination with said secondary identifier.

2. The authentication method as claimed in claim 1, wherein the secondary identifier contained in the signalling message is encrypted by way of a key shared with the application server.

3. The authentication method as claimed in claim 2, wherein the key is determined by the device from the contact address associated with the application and from an identifier of the application.

4. The authentication method as claimed in claim 1, wherein the main identifier and the authenticator contained in the notification are decrypted by way of a key shared with the application server.

5. The authentication method as claimed in claim 4, wherein the key is determined by the device from the contact address associated with the application and from an identifier of the application.

6. The authentication method as claimed in claim 1, wherein the device requests the secondary identifier by supplying an identifier of the application.

7. An authentication method for authenticating a user device with an application server implementing an application, said method comprising:
   acquiring, by the application server, a request to register said device by way of a main identifier and of a secondary identifier, which are acquired from a signalling message sent to a contact address associated with the application by the device identified by said main identifier, which is associated with the device by way of a security module, said signalling message comprising the secondary identifier in a payload of the signalling message, acquired by the device in order to receive notifications relating to the application, and the main identifier in a header of the signalling message, as an originating address of the signalling message;
   commanding, by the application server in response to the request to register, sending of a notification relating to the application and addressed to the device identified by the secondary identifier, said notification comprising the main identifier and an expected authenticator generated by the application server for authentication of the user device; and
   receiving, by the application server in response to the notification, an authentication request from the device, said request comprising the main identifier and the authenticator that were extracted from the notification, said device being authenticated by the application server by way of said main identifier in combination with said secondary identifier when the received authenticator corresponds to the expected authenticator.

8. The authentication method as claimed in claim 7, wherein the secondary identifier contained in the signalling message is decrypted by way of a key shared with the device.

9. The authentication method as claimed in claim 8, wherein the key is determined by the application server from the contact address associated with the application and from an identifier of the application.

10. The authentication method as claimed in claim 7, wherein the main identifier and the authenticator contained in the notification are encrypted by way of a key shared with the device.

11. The authentication method as claimed in claim 10, wherein the key is determined by the application server from the contact address associated with the application and from an identifier of the application.

12. A user device comprising:
a processor; and
a non-transitory computer-readable medium comprising instructions stored thereon, which when executed by the processor configure the user device to perform acts comprising:
communicating with a notification server, designed to acquire a secondary identifier, and to receive notifications relating to an application and addressed to the user device, which is identified by the secondary identifier;
sending to a contact address associated with the application a signalling message comprising the secondary identifier in a payload of the signalling message and, as an originating address of the signalling message, a main identifier in a header of the signalling message, which is associated with the device by way of a security module;
receiving in response to sending the signalling message a notification relating to the application and addressed to the user device identified by the secondary identifier and extracting from the notification the main identifier and an authenticator, which was generated by the application server for authentication of the user device; and
sending an authentication request to an application server, said request comprising the main identifier and the authenticator that were extracted from the received notification, for authentication of said device by the application server by way of said main identifier in combination with said secondary identifier.

13. An application server implementing an application, said application server comprising:
a processor; and
a non-transitory computer-readable medium comprising instructions stored thereon, which when executed by the processor configure the application server to perform acts comprising:
acquiring a request to register a user device by way of a main identifier and of a secondary identifier, which are acquired from a signalling message sent to a contact address associated with the application by the device identified by said main identifier, which is associated with the device by way of a security module, said signalling message comprising the secondary identifier in a payload of the signalling message, acquired by the device in order to receive notifications relating to the application, and comprising the main identifier in a header of the signalling message as an originating address of the signalling message;
commanding, in response to the request to register, sending of a notification relating to the application and addressed to the device identified by the secondary identifier, said notification comprising the main identifier and an expected authenticator generated by the application server for authentication of the user device; and
receiving, in response to the notification, an authentication request from the device that requested to be registered, said request comprising the main identifier and the authenticator that were extracted from the notification, said device being authenticated by the application server by way of said main identifier in combination with said secondary identifier when the received authenticator corresponds to the expected authenticator.

14. A non-transitory computer-readable recording medium comprising instructions stored thereon, which when executed by a processor of a user device configure the user device to authenticate the user device with an application server implementing an application, said authentication comprising:
acquiring, by the device, a secondary identifier allowing the device to receive notifications relating to the application, the device also being identified by a main identifier, which is associated with the device by way of a security module;
sending, by the device to a contact address associated with the application, a signalling message comprising the secondary identifier in a payload of the signalling message and the main identifier in a header of the signalling message as an originating address of the signalling message;
receiving, by said device in response to sending the signalling message, a notification relating to the application and addressed to the device identified by the secondary identifier, said notification comprising the main identifier and an authenticator generated by the application server for authentication of the user device, and the sending of which was commanded by the application server; and
sending, by said device, to the application server, an authentication request, said request comprising the main identifier and authenticator that were extracted fro the notification, for authentication of said device by the application server by way of said main identifier in combination with said secondary identifier.

15. A non-transitory computer-readable recording medium comprising instructions stored thereon, which when executed by a processor of an application server implementing an application, configure the application server to authenticate the user device with the application server, said authentication comprising:
acquiring, by the application server, a request to register said device by way of a main identifier and of a secondary identifier, which are acquired from a signalling message sent to a contact address associated with the application by the device identified by said main identifier, which is associated with the device by way of a security module, said signalling message comprising the secondary identifier in a payload of the signalling message, acquired by the device in order to receive notifications relating to the application, and the main identifier in a header of the signalling message as an originating address of the signalling message;
commanding, by the application server in response to the request to register, sending of a notification relating to the application and addressed to the device identified by the secondary identifier, said notification comprising the main identifier and an expected authenticator generated by the application server for authentication of the user device; and
receiving, by the application server in response to the notification, an authentication request from the device, said request comprising the main identifier and an authenticator that were extracted from the notification, said device being authenticated by the application server by way of said main identifier in combination with said secondary identifier when the received authenticator corresponds to the expected authenticator.

\* \* \* \* \*